US012794778B2

(12) United States Patent
Korman et al.

(10) Patent No.: US 12,794,778 B2
(45) Date of Patent: Nov. 10, 2026

(54) STATELESS RESOURCE MANAGEMENT

(71) Applicant: NetApp Inc., San Jose, CA (US)

(72) Inventors: Alexander Korman, Tel Aviv (IL); Jonathan Nissan, Tel Aviv (IL); Dekel Sharabi, Tel Aviv (IL)

(73) Assignee: NetApp, Inc., San Jose, CA (US)

( * ) Notice: Subject to any disclaimer, the term of this patent is extended or adjusted under 35 U.S.C. 154(b) by 483 days.

(21) Appl. No.: 17/727,932

(22) Filed: Apr. 25, 2022

(65) Prior Publication Data

US 2022/0247640 A1 Aug. 4, 2022

Related U.S. Application Data

(63) Continuation of application No. 15/822,195, filed on Nov. 26, 2017, now Pat. No. 11,316,742, which is a continuation of application No. 14/590,148, filed on Jan. 6, 2015, now Pat. No. 9,832,078.

(51) Int. Cl.
*H04L 41/12* (2022.01)

(52) U.S. Cl.
CPC .................................... *H04L 41/12* (2013.01)

(58) Field of Classification Search
CPC .... H04L 41/0896; H04L 41/12; H04L 41/122
USPC .......................................................... 709/226
See application file for complete search history.

(56) References Cited

U.S. PATENT DOCUMENTS 6,041,349 A 3/2000 Sugauchi et al.
8,073,816 B1 * 12/2011 Luke .................... G06F 3/0632 707/644
8,180,813 B1 5/2012 Goodson et al.
8,484,259 B1 * 7/2013 Makkar ................ G06F 16/907 707/769
8,595,346 B2 * 11/2013 Bairavasundaram ........................ H04L 41/5009 709/224
9,378,276 B1 6/2016 Mengle et al.
11,316,742 B2 4/2022 Korman et al.
2012/0198069 A1 * 8/2012 Black ................... G06F 9/5027 709/226

OTHER PUBLICATIONS

Final Office Action mailed on Apr. 29, 2020 for U.S. Appl. No. 15/822,195, filed Nov. 26, 2017, 16 pages.

(Continued)

*Primary Examiner* — Vivek Srivastava
*Assistant Examiner* — Hien V Doan
(74) *Attorney, Agent, or Firm* — COOPER LEGAL GROUP LLC

(57) ABSTRACT

A method for managing a resource configuration of a heterogeneously managed computer system. During processing of a resource management request, retrieving a set of resource tags are retrieved. Each resource tag associates a local resource identifier that is assigned within a first configuration management domain with an index identifier that is assigned within a second configuration management naming domain. The retrieved tags are mutually associated utilizing the index identifiers to generating a system configuration map. The resource management request is compared with the system configuration map to identify target resources and corresponding target resource information. One or more resource queries are generated based on the identified target resource and corresponding target resource information.

19 Claims, 6 Drawing Sheets

(56) References Cited

OTHER PUBLICATIONS

Final Office Action mailed on Mar. 9, 2021 for U.S. Appl. No. 15/822,195, filed Nov. 26, 2017, 18 pages.
Non-Final Office Action mailed on Aug. 21, 2020 for U.S. Appl. No. 15/822,195, filed Nov. 26, 2017, 24 pages.
Non-Final Office Action mailed on Nov. 15, 2019 for U.S. Appl. No. 15/822,195, filed Nov. 26, 2017, 14 pages.
Notice of Allowance mailed on Dec. 29, 2021 for U.S. Appl. No. 15/822,195, filed Nov. 26, 2017, 7 pages.

* cited by examiner

STATELESS RESOURCE MANAGEMENT

RELATED APPLICATIONS

This application claims priority to and is a continuation of U.S. patent application Ser. No. 15/822,195, titled "MAINTAINING TIMESTAMP PARITY OF OBJECTS WITH ALTERNATE DATA STREAMS DURING TRANSITION PHASE TO SYNCHRONOUS STATE" and filed on Nov. 26, 2017, which claims priority to and is a continuation of U.S. Pat. No. 9,832,078, titled "MAINTAINING TIMESTAMP PARITY OF OBJECTS WITH ALTERNATE DATA STREAMS DURING TRANSITION PHASE TO SYNCHRONOUS STATE" and filed on Jan. 6, 2015, which are incorporated herein by reference.

BACKGROUND

Embodiments of the disclosed subject matter generally relate to the field of networked, distributed computer resource management and, more particularly, to on-demand resource management in a heterogeneous resource management environment.

Large-scale data processing environments include substantial computer system resources including processing, storage, and network fabric elements. System reliability and efficiency depend on accurate and timely management of the many interdependent resources. Large systems therefore require some form of systematic resource management, typically comprising periodic collection and storage of system configuration data to form snapshots of the system's configuration state which can be used to support configuration directives.

BRIEF DESCRIPTION OF THE DRAWINGS

The embodiments may be better understood by referencing the accompanying drawings.

DESCRIPTION OF EMBODIMENTS

Figure 1:
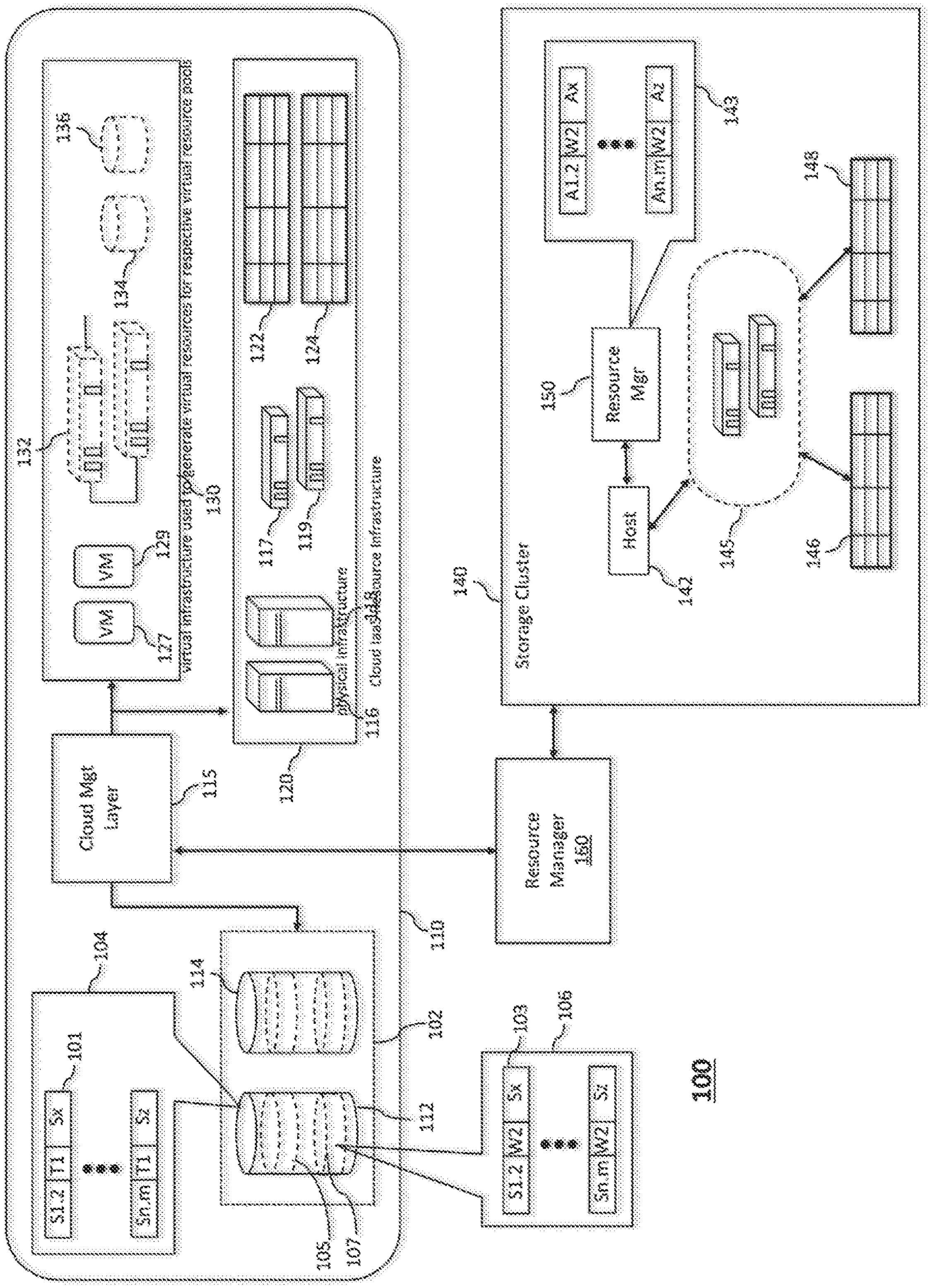
FIG. 1 is a block diagram depicting a heterogeneous resource provisioning environment in accordance with an aspect.

The description that follows includes example systems, methods, techniques, instruction sequences and computer program products that embody techniques of the disclosed subject matter. However, it is understood that the described embodiments may be practiced without one or more of these specific details. Well-known instruction instances, protocols, structures and techniques have not been shown in detail in order not to obfuscate the description. As utilized herein, a "resource" is any physical or virtual/logical element, component, device or groups of such elements, components, or devices that may be included within a computer system. A physical resource may be, for example, a storage disk or a storage array in which the disk is included. Virtual resources include virtual storage volumes, virtual machines, network sockets (representing physical connections), etc.

Centralized computer resource management is typically a subset of enterprise-wide systems management, entailing comprehensive monitoring and administration of distributed processing, storage, and networking systems. Resource management may encompass monitoring and provisioning hardware devices and components such as network interface cards and storage disks, as well as operating systems, virtual devices, etc. Centralized resource management enables provisioning the hardware and software inventories of one or more associated systems in a manner that accounts for system wide and inter-system configuration dependencies.

The disclosed features include a centralized, on-demand (i.e., stateless) resource management system that enables efficient resource data acquisition in support of pending resource management requests/directives. In some embodiments, the resource management system is applied as an overlay to heterogeneously managed (i.e., multiple independently or otherwise differently managed) computing and storage environments in which systems and subsystems may have multiple, overlapping resource naming domains. As explained in further detail with reference to the figures, such an environment may arise in a cloud or hybrid cloud provisioning context in which enterprise systems and resources span across privately provisioned and managed configurations and cloud provisioned and managed configurations. As utilized herein "cloud" refers to cloud computing environments generally characterized as comprising multiple centrally managed networked servers that enable online (i.e., via network) access to computer hardware and software resources.

In such an environment, the cloud-provisioned computing and storage resources are directly provisioned and managed, at least at the physical level, by a management system having different resource inter-dependencies and different resource naming conventions than a management system governing the combined cloud-provisioned and privately-provisioned system(s). Aspects of the present disclosure provide a system and method for querying and managing computing resources distributed across multiple resource management naming domains (e.g., privately manage computer resources and cloud computing resources).

FIG. 1 is a schematic block diagram depicting a global resource manager node 160 that provisions and otherwise manages resources within a heterogeneously managed data processing environment 100. Data processing environment 100 includes a storage cluster system 140, as well as processing, storage, and network resources provisioned by a cloud infrastructure 110. In one embodiment, global resource manager 160 associates physical and virtual resources within storage cluster 140 with physical and virtual resources provisioned by cloud infrastructure 110 to form a system that is logically and/or communicatively interrelated at an application, system, and/or enterprise management level.

Cloud infrastructure 110 includes hardware, application and system software, and cloud management resources that enable on-demand, elastic provisioning and resource pooling for online clients such as global resource manager 160. Cloud infrastructure 110 includes a provisioning and management layer 115 that operatively manages a physical infrastructure layer 120 and a virtual infrastructure layer 130. Physical infrastructure layer 120 comprises physical computing resources such as servers 116 and 118, physical switches 117 and 119, and storage arrays 122 and 124. Servers 116 and 118 may be interconnected and/or may be connected to storage systems (not depicted) that control storage arrays 122 and 124 via network devices including switches 117 and 119. The resources within physical infrastructure layer 120 may be configured as processing clusters, storage clusters, or other configurations such as may be found within data centers using multiple network types as managed by infrastructure program code within cloud management layer 115.

Virtual infrastructure layer 130 comprises virtual machines 127 and 129, virtual network devices 132, and virtual storage devices 134 and 136. The resources within virtual infrastructure layer 130 are generated by cloud service logic within cloud management layer 115. Cloud infrastructure 110 applies virtualization such as via the virtualized elements within virtual infrastructure layer 130 to generate a virtualization layer on top of the physical infrastructure layer 120.

Cloud management layer 115 includes logic and instructions for managing and provisioning physical infrastructure layer 120 itself as well as provisioning resources within physical infrastructure layer 120 to clients such as global resource manager 160 in response to provisioning requests. Resource provisioning within cloud infrastructure 110 entails dynamic (i.e., on-demand) procurement of computing resources that are utilized to perform tasks within the cloud computing environment. Cloud management layer 115 includes a client portal that provides access to cloud computing resources by system administrators in support of such resource provisioning.

In the depicted embodiment, cloud infrastructure 110 is configured as an Infrastructure as a Service (IaaS) service provider. IaaS provisioning enables clients, such as resource manager 160, to "self-serve" from a selection of processing, storage, and network resources such as from physical infrastructure layer 120. A feature of IaaS is that it is configured to logically segregate physical and logical computing resources within the cloud infrastructure, effectively filtering traffic between different members of the same cloud infrastructure and specifying rules for how that traffic should flow. This feature that provides partitioned access to each of multiple clients is sometimes referred to as multi-tenancy. To enable such resource partitioning among clients, direct access to and management of the physical resources within cloud infrastructure 110 are performed internally via cloud management layer 115. Clients, such as global resource manager 160, may include their own respective management systems for installing and executing operating systems and application software, and also to instantiate virtualized constructs such as virtual machines onto the physical resources that are provisioned and managed at least at the physical level by cloud management layer 115.

In support of its resource provisioning and management functions, cloud management layer 115 includes code and other logic components such as for processing client requests and responses, storing client (tenant) account information, queueing pending requests, etc. Clients may interact with cloud management layer 115 via user interface(s) and command line(s), or programmatically via application programming interfaces (APIs), scripts, and similar mechanisms. To manage and coordinate resource allocation among multiple clients such as resource manager 160, cloud management layer 115 obtains and stores client account information including resource configurations. For example, cloud management layer 115 may analyze a given client request, iterating over resource capacity data, and submitting and processing one or more jobs to fulfill the request. In the depicted embodiment, cloud management layer 115 generates and manages the resultant client resource information within an enterprise account that includes tenant accounts 112 and 114. The resources allocated in tenant accounts 112 and 114 may be further divided into specified working environment constructs, such as working environment constructs 105 and 107.

As further depicted in FIG. 1, resource manager node 160 is also communicatively coupled to cluster storage system 140. Cluster storage system 140 may be configured as a storage area network and includes a network connection 145 for interconnecting cluster components such as a host server 142 and storage arrays 146 and 148. Storage cluster 140 further includes a local resource manager node 150 that is communicatively coupled to host 142. While depicted separately for ease of illustration, local resource manager 150 may be incorporated within host 142 and comprises software and/or hardware resources for provisioning, configuring, and otherwise managing the hardware and software components within storage cluster 140.

In the depicted embodiment, global resource manager 160 associates physical and virtual resources within storage cluster 140 with physical and virtual resources provisioned by cloud management layer 115 to form a distributed system that is logically and/or communicatively interrelated at an application, system, and/or enterprise management level. For example, global resource manager 160 may associate cluster storage system 140 with cloud resources provisioned within tenant account 112 to form a hybrid cloud processing and storage environment.

Identifying resources, individually and in aggregate, is a fundamental capability of most resource managers. As explained above, cloud infrastructure 110 and storage cluster 140 each have internal resource allocation and management functions implemented by cloud management layer 115 and local resource manager 150, respectively. The resource naming system/convention implemented by cloud management layer 115 to internally identify resources within cloud infrastructure 110 is typically independent of or otherwise different than that used by resource manager 150 to identify resources within storage cluster 140. In its provisioning interactions with cloud management layer 115 and local resource manager 150, global resource manager 160 may have limited or no access to resource naming conventions used to manage hardware or other resources within cloud infrastructure 110 or storage cluster 140. Such partitioning of resource naming presents obstacles for comprehensive management of resources provisioned by cloud infrastructure 110 and/or storage cluster 140 for systems to be managed at some level by global resource manager 160.

The depicted embodiment includes a resource tagging system to enable centralized management of resources distributed across multiple configurations having different naming domains such as implemented by cloud management layer 115 and local resource manager 150. As shown in FIG. 1, an enterprise account 102 includes tenant accounts 112 and 114 that, as explained above, include resource and configuration information. Included in the resource and configuration information are tags that are associated with individual resources and which enable an external resource manager, such as global resource manager 160, to efficiently obtain information about, for example, hardware resources that it does not directly provision or manage.

As further shown in FIG. 1, tenant account 112 includes a set of tenant resource tags 104 that are associated with individual resources (e.g., processors, storage arrays, etc.) that have been allocated to a specified client tenant by cloud management layer 115, in response for example, to a provisioning request by global resource manager 160. Representative of tenant resource tags 104 is a resource tag 101, which includes fields containing a local resource identifier, S1.2, a resource access key, T1, and a remote resource identifier, Sx. Local resource identifier S1.2 is generated, stored, and utilized by cloud management layer 115 in its allocation and management of the represented resource. The local resource identifier is used by cloud management layer 115 in association with the resource independently of which client environment (e.g., as represented by tenant account 112 or 114) the resource may be provisioned to. Resource access key T1 is typically a numeric or alphanumeric character code that enables access by a client, such as global resource manager 160, to a category of resources the resource identified by cloud management layer 115 as belonging within the tenant T1 resource account. Remote resource identifier Sx is utilized to identify the same resource as identified locally as S1.2, but is assigned by another configuration management domain. In the depicted example, global resource manager 160 assigns Sx as well as each of the other remote resource identifiers within each of tenant resource tags 104.

Each provisioned resource within cloud infrastructure 110 may include multiple tags that collectively provide information about the configuration of the tagged resource. As shown in FIG. 1, the resource identified as S1.2 by cloud management layer 115 is further identified as belonging to a specified working environment by the use of a working environment tag 103 within a set of working environment tags 106 that each include an access key W2.

Figure 2:
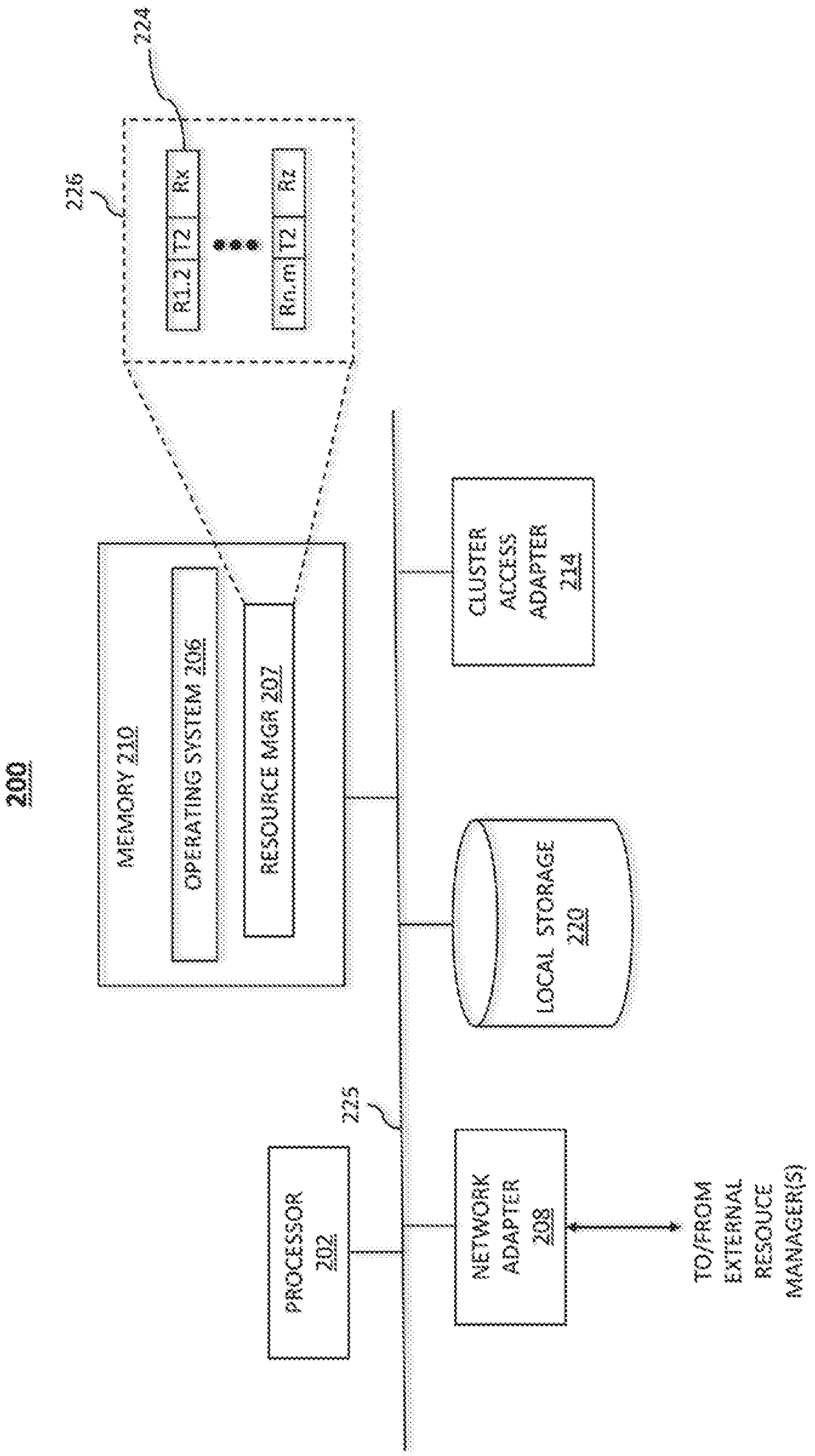
FIG. 2 is a block diagram illustrating a resource manager node in accordance with an aspect.

FIG. 2 is a block diagram providing a more detailed illustration of a resource manager node 200 that may be used to perform operations of either of resource managers 160 or 150. Resource manager 200 includes a system bus 225 that interconnects one or more processors 202, a memory 210, a network adapter 208, a cluster access adapter 214, and local storage 220. The local storage 220 comprises one or more storage devices, such as magnetic disks or SSDs, which are utilized within node 200 to locally store resource configuration information. Cluster access adapter 214 includes multiple ports adapted to couple node 200 to nodes of a storage cluster if, for example, resource manager node 200 is a storage cluster host. Network adapter 208 comprises multiple ports adapted to couple node 200 to one or more server or client nodes over point-to-point links, wide area networks, virtual private networks implemented over a public network or a shared local area network. Network adapter 208 thus may comprise the structure and circuitry as well as the logic constructs needed to communicatively couple node 200 to a network which may be an Ethernet or Fibre Channel network.

Memory 210 comprises storage locations that are addressable by the processors and adapters for storing program instructions, data, and data structures associated with the disclosed embodiments. The processor and adapters may, in turn, comprise processing elements and/or logic circuitry configured to execute the program code and manipulate the data structures. Node 200 executes an operating system 206 that preferably implements a high-level module, such as a file system, to logically organize the information as a hierarchical structure of named data containers, such as directories and files. Memory 210 further includes memory space allocated to program instructions and data structures forming a resource manager application 207. When executed by a processor resource manager application 207 performs operations depicted and described in further detail with reference to FIGS. 3 and 4.

Also stored in the memory space allocated for resource manager application 207 is a list 226 of retrieved resource tags including a resource tag 224 that comprises fields containing a local resource identifier, R1.2, a resource access tag, T2, and a remote resource identifier, Rx. Local resource identifier R1.2 is maintained and used by resource management node 200 in its allocation of the specified underlying physical or virtual computing resource. Resource access tag T2 contains an access key (typically a numeric or alphanumeric character code) that enables access by an external client that provides the key in a request to the resource identified by resource management node 200 as R1.2. Remote resource identifier Rx is utilized to identify the same resource, R1.2, but is assigned by another configuration management domain. Another, "remote" resource manager (not depicted) has assigned Rx as well as each of the other remote resource identifiers within each of the resource tags within list 226.

Figure 3:
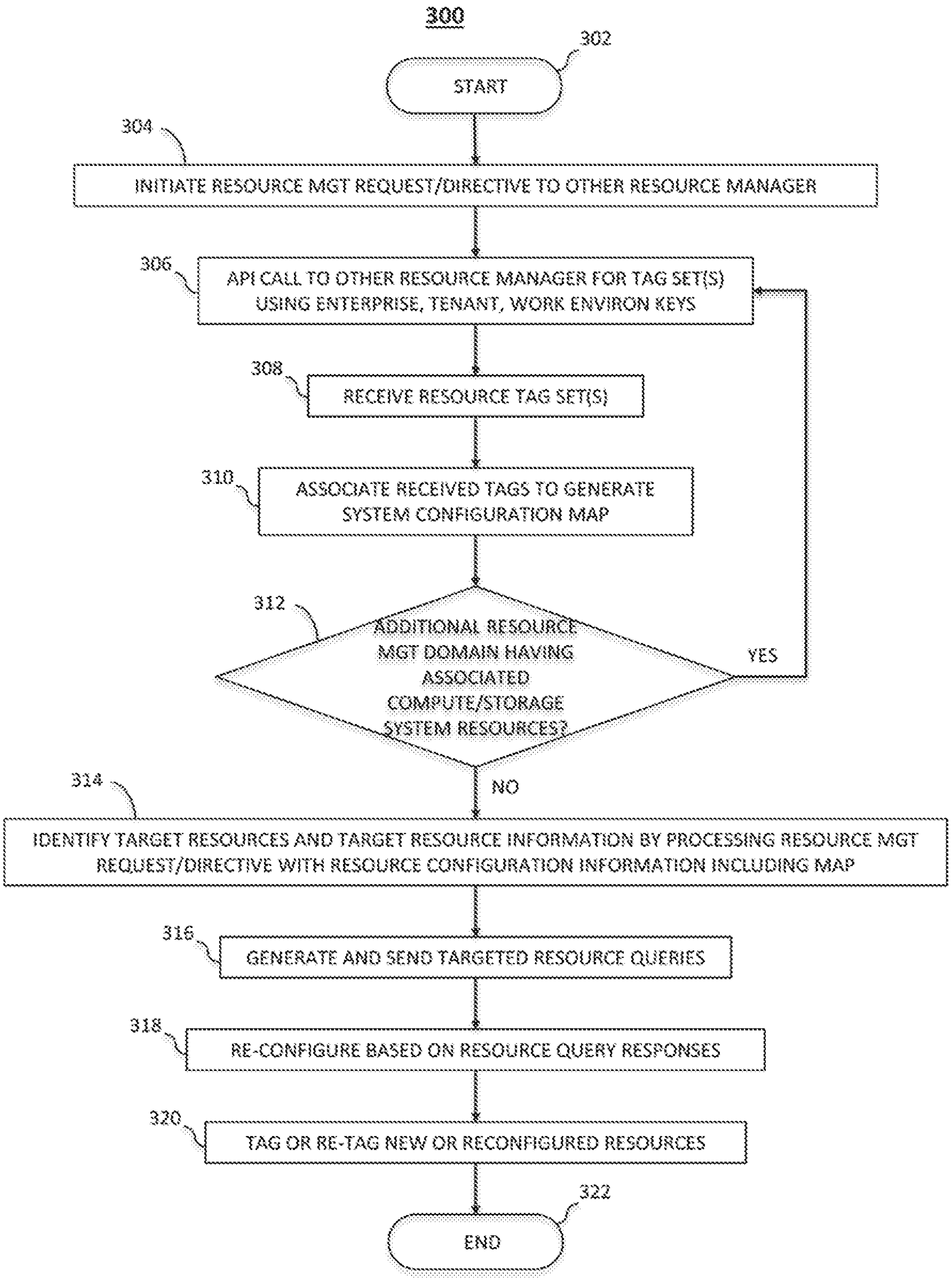
FIG. 3 is a flow diagram illustrating operations performed by a stateless resource management system in accordance with an aspect.

FIG. 3 is a flow diagram illustrating operations performed by a stateless resource management system in accordance with one embodiment. The operations begin as shown at blocks 302 and 304 with a second resource manager initiating a resource management request that is to be sent to a first resource manager. The resource management request may be any request to modify an existing resource configuration. For example, the resource management request may be a request/directive to add or remove a disk to or from a specified storage array. The first resource manager may be considered "local" or "internal" because the request from the second resource manager is directed to computing resources that are directly managed by the first resource manager using a resource management naming domain that is independent of or otherwise different from a configuration management naming domain used by the second resource manager. As shown at block 306, as part of processing the resource management request, the second resource manager issues one or more API calls to the first resource manager to retrieve a set of resource tags that are associated with resources belonging to a specified resource pool. The resource pool is specified by a key included in the API call(s) and may designate, for example, an enterprise, a tenant, or a working environment. In case an enterprise is designated (and as depicted and described with reference to FIGS. 1 and 6), resources of tenants and working environments are hierarchically subsumed within the enterprise and therefore are included in the scope of the calls.

As shown at block 308, the resource tags corresponding to the keys and therefore identified as belonging within the specified resource pool are returned to the requesting resource manager. The retrieved resource tags each include a first, local resource identifier (i.e., an identifier assigned within the configuration management naming domain of the first resource manager) associated with a second resource identifier that is assigned by the configuration management naming domain of the second, remote resource manager. In one embodiment, the second resource identifier includes a remote resource identifier associated with a configuration descriptor. Having been assigned in the resource management naming domain of the second resource manager, the remote resource identifier is a name assigned to the specified resource as recorded by the second resource manager, and the configuration descriptor includes information describing the connectivity and logical relationships of the specified resource in the system view managed by the second resource manager. The second resource manager then mutually associates the retrieved resource tags using the second resource identifiers to generate a system image (block 310). The image may comprise a system configuration map that reveals the resources represented by the resource tags and the relationships among the resources as determined by evaluating the second resource values of the tags.

The second resource manager determines whether additional system images should be generated from other resource managers (block 312) and, if not, the process continues as shown at block 314 with the second resource manager processing the resource management request using the system configuration map to identify target resources and target resource information. In one embodiment, the target resources and target resource information are identified by comparing the instructions and operands within the resource management request with resources specified in the second resource identifier fields of the mapped tags. As shown at block 316, the second resource manager generates resource queries that are specific to the identified target resources and corresponding resource information, and sends the queries to the first resource manager. In one embodiment, each of the one or more queries specifies a resource identifier assigned to one of the identified target resources within the resource management naming domain of the first resource manager. Responses to the queries are sent to the second resource manager which may modify the original resource management request. As shown at block 318, the second resource manager configures or re-configures based on the query responses and the process ends following tagging of the newly provisioned or reconfigured resources as shown at blocks 320 and 322.

Figure 4:
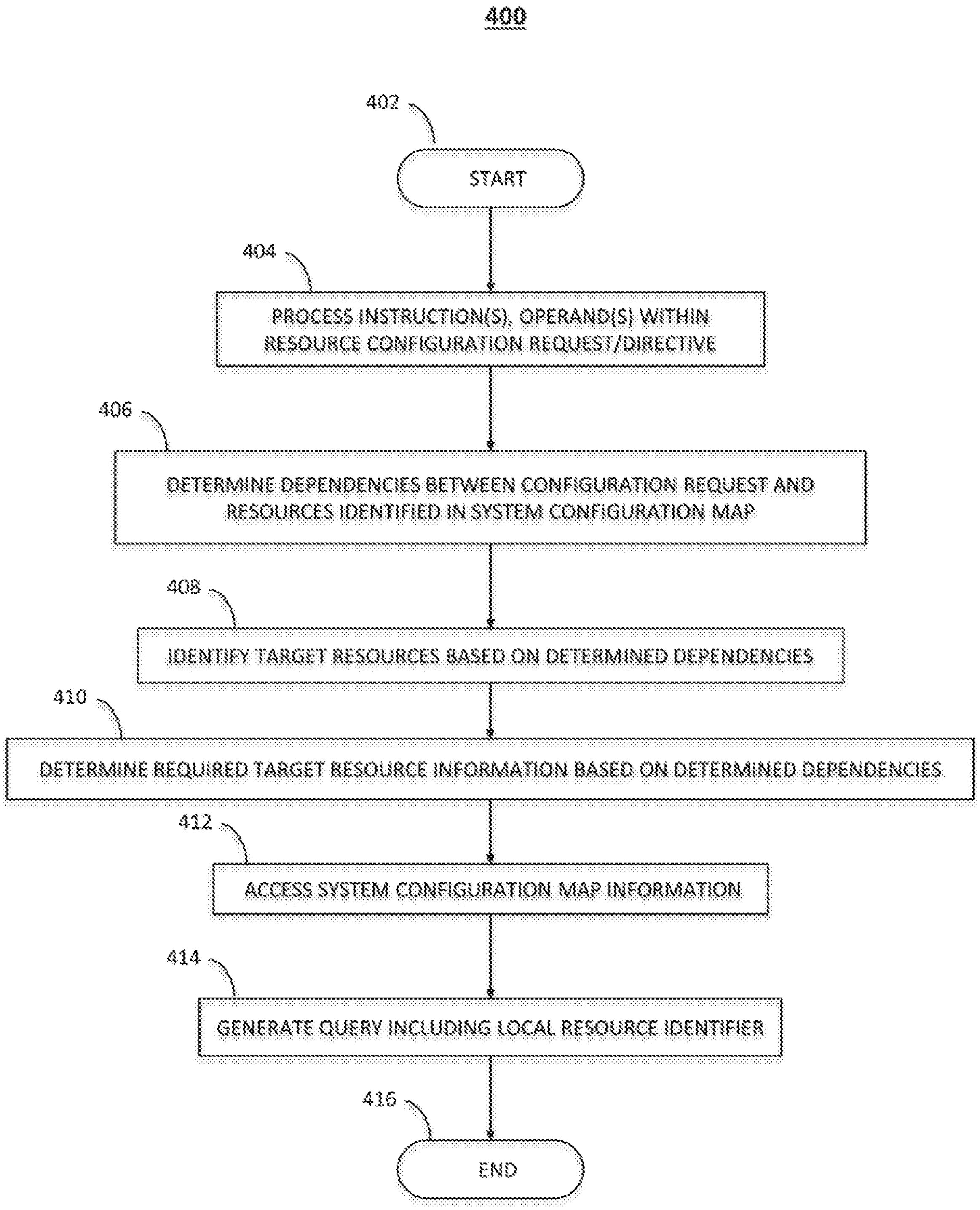
FIG. 4 is a flow diagram depicting operations performed to process resource management directives in association with a management domain configuration map in accordance with an aspect.

FIG. 4 is a flow diagram depicting operations performed to process resource management requests in association with a system configuration map in accordance with one embodiment. The process begins as shown at blocks 402 and 404 with a resource manager processing (e.g., parsing, extracting, comparing, etc.) the instructions and operands specified by a resource management request to determine dependencies between the resource management request and resources identified in a system configuration map such as that generated at block 310 of FIG. 3. Based on the determined dependencies, the resource manager identifies one or more target resources (block 408). In addition to identifying the resources to which queries should be directed (i.e., the target queries), the resource manager also determines what information to obtain from the targeted sources and makes that determination based on the determined dependencies (block 410). Having identified the target resources and determined the necessary target information to be obtained from those resources, the process is completed with the resource manager accessing the system configuration map and generating one or more queries that include resource identifiers assigned within a configuration management naming domain that is external to and independent of the configuration management naming domain of the resource manager (blocks 412, 414, and 416).

Figure 5:
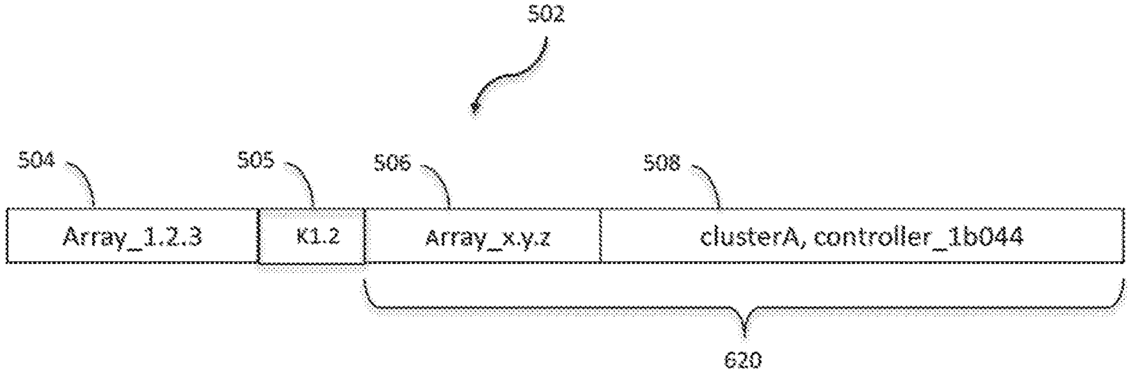
FIG. 5 is a schematic diagram illustrating a resource tag in accordance with an aspect.

FIG. 5 is a schematic diagram illustrating a resource tag 502 in accordance with an aspect of the present disclosure. As depicted and described with reference to FIGS. 1-4, resource tags can be generated and mutually associated to map specified resources and resource pools from a first system configuration image to a second system configuration image. To this end, resource tag 502 includes a local resource identifier field 504 containing identifier Disk_Array_1.2.3. In one embodiment, the identifier contained in field 504 is assigned within a given resource management naming domain, such as a particular cloud computing management layer. Resource tag 502 further includes a key field 505 containing key K1.2 that a local resource manager uses to enable access to the resource. Resource tag 502 further includes a remote resource identifier 520 that comprises a remote resource identifier field 506 and a configuration descriptor field 508. Remote resource identifier field 506 contains identifier Disk_Array_x.y.z that is assigned in a resource management naming domain that is independent of or otherwise different than the naming domain in which local resource identifier Array_1.2.3 is assigned. Configuration descriptor field 508 contains configuration description clusterA, controller_1b044, which in the depicted example may indicate the manner in which the resource identified as Array_x.y.z is configured and interconnected within the system configuration.

Figure 6:
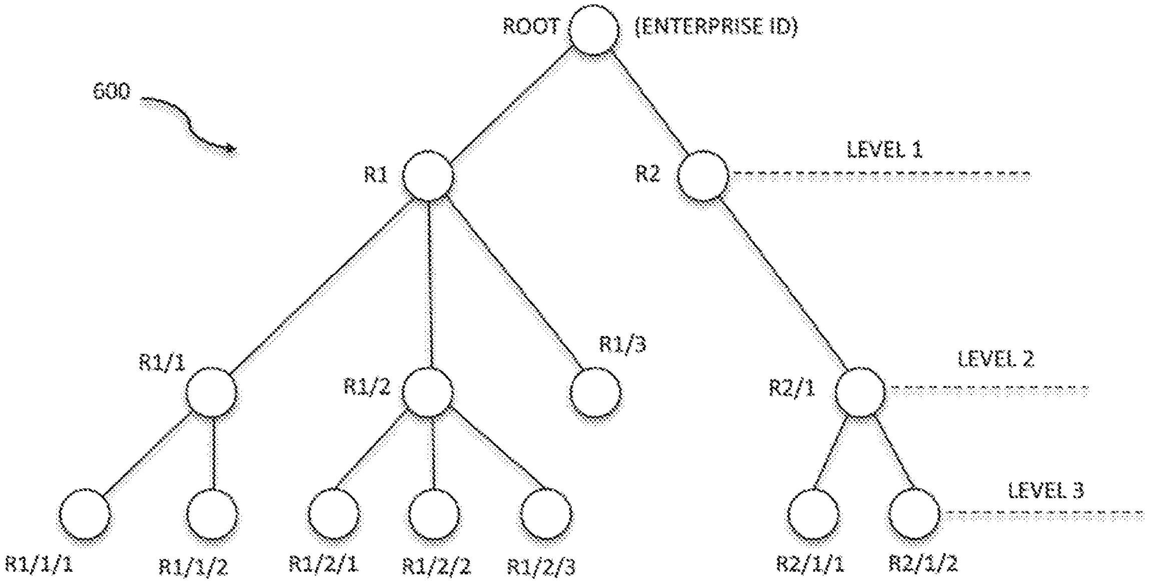
FIG. 6 is a schematic diagram representing a management domain configuration map in accordance with an aspect.

FIG. 6 depicts a system configuration map in the form of a resource management data tree 600 having multiple levels of resource objects depicted as end nodes. All resource object node levels descend from a top-level node that in the depicted embodiment represents enterprise-wide data processing, storage, and networking system resources (referred to collectively or in any combination herein as "computer resources"). The next lower level, "Level 1" in the depicted example, includes two resource object nodes, with associated nodes indicated respectively as node R1 and node R2. The next lower level, "Level 2," includes resource object nodes R1/1, R1/2, and R1/3 (descending from node R1 in Level 1), and R2/1 (connected to node R2). The lowest depicted level, "Level 3," includes resource object nodes R1/1/1 and R/1/1/2 (both descending from R1/1), R1/2/1, R1/2/2, and R1/2/3 (descending from R1/2), and R2/1/1 and R2/1/2 (descending from R2/1).

In the depicted example, the top level node, ROOT, represents the entire set of resources represented by the set of resource tags retrieved by the remote resource manager such as the API call depicted at step 306 of FIG. 3. The level of the ROOT node is determined by the parameter in the resource tag request corresponding to the key values depicted with reference to FIGS. 1, 2, and 5. For example, if the API call specifies a parameter corresponding to an enterprise/tenant key, the local resource manager will send all resource tags within the scope of the enterprise tenant. If, instead a working environment parameter is specified in the tag request, the local resource manager will send the corresponding subset of resource tags to include only those in the specified working environment. Descending hierarchically from the ROOT node, each of the branch nodes within LEVEL 1 and LEVEL 2 are interconnected to one higher-level parent node and at least one lower-level child node until the leaf nodes of LEVEL 3 are reached. In accordance with an aspect of the depicted example, the illustrated hierarchical node connects are determined by the remote resource manager based on associations between information in the resource IDs of the respective resource tags. For example, the resource identities and the configuration descriptors within the remote resource IDs of the resource tags may indicate system, device, and component groups having associations as indicated in the depicted hierarchical map.

As explained with reference to FIG. 4, the remote resource manager that requests the tags and generates the system configuration map such as map 600, processes the original resource management request with respect to the generated map to determine which entities (nodes in the depicted map, for example) the resource management request is dependent on. For example the resource management request may comprise a request to add a disk (which is not represented in the system map because it has not yet been added) to a specified disk array. By generating a system configuration map, such as map 600, the remote resource manager can associate the disk array ID that is included in both the request and the map and determine what other resources in addition to the specified disk array should be target for further configuration information using the local resource ID queries depicted in FIG. 4.

Figure 7:
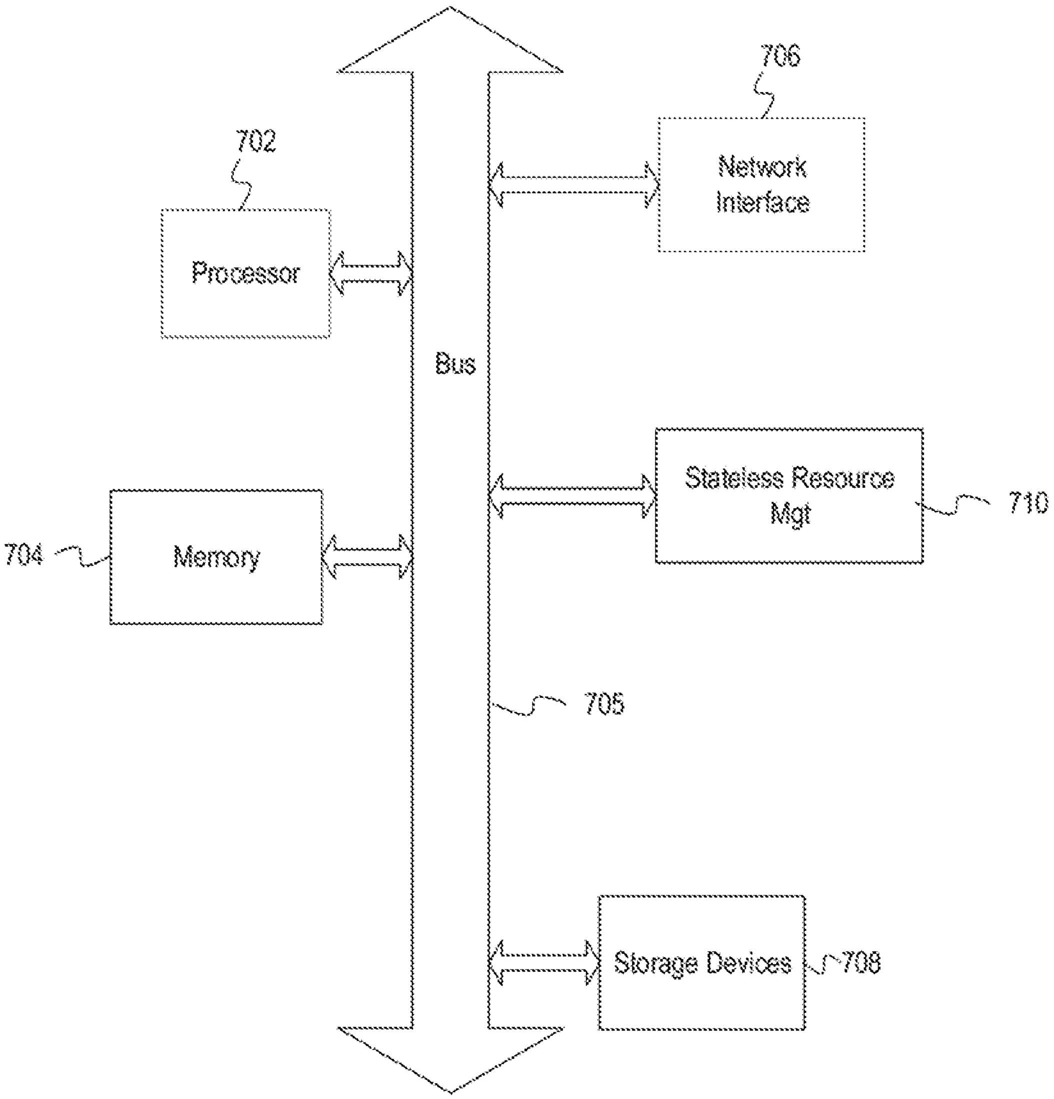
FIG. 7 depicts an example computer system for implementing the features shown in FIGS. 1-6.

FIG. 7 depicts an example computer system having a stateless resource management unit 710. The computer system includes a processor 702 (possibly including multiple processors, multiple cores, multiple nodes, and/or implementing multi-threading, etc.). The computer system includes memory 704 which may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes an interconnect 705 (e.g., PCI, ISA, PCI-Express, HyperTransport®, InfiniBand®, NuBus, etc.), a network interface 706 (e.g., an Ethernet interface, a Frame Relay interface, SONET interface, wireless interface, etc.), and a storage device(s) 708 (e.g., optical storage, magnetic storage, etc.). Resource management unit 710 embodies functionality to implement features described above with reference to FIGS. 1-6. Resource management unit 710 may perform operations that facilitate management of a heterogeneously managed data processing environment in which a system configuration map is generated from among multiple configuration naming domains. Resource management unit 710 may perform system management operations including retrieving a set of resource tags during or otherwise in logical association with a resource management request or directive, and using index identifiers within the tags to generate a system configuration map which can then be used to identify one or more target resources. Any one of these functionalities may be partially (or entirely) implemented in hardware and/or on processor 702. For example, the functionality may be implemented with an application specific integrated circuit, in logic implemented in processor 702, in a co-processor on a peripheral device or card, etc. Further, realizations may include fewer or additional components not illustrated in FIG. 7 (e.g., additional network interfaces, peripheral devices, etc.).

As will be appreciated by one skilled in the art, aspects of the disclosed subject matter may be embodied as a system, method or computer program product. Accordingly, embodiments of the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the disclosed subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

While the embodiments are described with reference to various implementations and exploitations, it will be understood that these embodiments are illustrative and that the scope of the disclosed subject matter is not limited to them. In general, techniques for non-disruptively replacing a storage controller as described herein may be implemented with facilities consistent with any hardware system or hardware systems. Many variations, modifications, additions, and improvements are possible.

What is claimed is:

1. A system comprising:

a processor; and a machine readable storage medium having program code stored therein that is executable by the processor to cause the processor to perform operations that:

associates physical resources and virtual resources within a storage cluster with physical resources and virtual resources provisioned by a cloud infrastructure to form a system that is logically and communicatively interrelated at an application and system level between the storage cluster and the cloud infrastructure;

assigns a resource tag representative of a tenant resource tag for a resource, wherein the resource tag comprises:

a first field populated with a local resource identifier used by the cloud infrastructure to allocate and locally identify the resource within the cloud infrastructure, wherein the local resource identifier is assigned according to a first configuration management domain of the cloud infrastructure, a second field populated with a resource access key granting a client with access to a category of resources belonging to a tenant resource account of the client, and a third field populated with a remote resource identifier assigned according to a second configuration management domain, different than the first configuration management domain, for remotely identifying the resource utilizes the resource tag to access the resource identified by the remote resource identifier, wherein the resource access key is used to obtain access to the category of resources that includes the resource;

manages a physical infrastructure layer and a virtual infrastructure layer, wherein the local resource identifier is used to manage the resource; and processes client requests and responses, store client account information, and queue pending client requests.

2. The system of claim 1, wherein the physical infrastructure layer comprises physical computing resources, physical switches, and storage arrays.

3. The system of claim 1, wherein the virtual infrastructure layer comprises virtual machines, virtual network devices, and virtual storage devices.

4. The system of claim 1, wherein execution of the program code by the processor causes the processor to:
generate resources within the virtual infrastructure layer.

5. The system of claim 1, wherein execution of the program code by the processor causes the processor to:
manage and provision the physical infrastructure layer and provision resources within the physical infrastructure layer in response to provisioning requests.

6. The system of claim 1, wherein execution of the program code by the processor causes the processor to:
provide access to cloud computing resources.

7. The system of claim 1, comprising:
rules implemented by the cloud infrastructure to filter traffic between members of the cloud infrastructure.

8. The system of claim 1, comprising:
rules implemented by the cloud infrastructure to direct a flow of traffic within the cloud infrastructure.

9. The system of claim 1, wherein execution of the program code by the processor causes the processor to:
provide resource partitioning amongst clients and internally provides direct access to and management of physical resources within the cloud infrastructure.

10. The system of claim 1, wherein execution of the program code by the processor causes the processor to:
install and execute operating systems and application software.

11. The system of claim 1, wherein execution of the program code by the processor causes the processor to:
instantiate virtualized constructs onto physical resources that are provisioned and managed at a physical level.

12. The system of claim 1, wherein execution of the program code by the processor causes the processor to:
analyze a client request and submit and process one or more jobs to fulfill the client request.

13. The system of claim 1, wherein resources allocated to a client account are divided into working environment constructs.

14. The system of claim 1, wherein execution of the program code by the processor causes the processor to:
provision, configure, and manage hardware and software components within the storage cluster.

15. The system of claim 1, wherein execution of the program code by the processor causes the processor to:
implement a resource naming convention to internally identify resources within the cloud infrastructure, wherein the resource naming convention is independent and different than a resource naming convention utilized by a local resource manager of the storage cluster to identify resources within the storage cluster.

16. The system of claim 1, wherein execution of the program code by the processor causes the processor to:
identify the resource using the local resource identifier, wherein the remote resource identifier is assigned by the second configuration management domain different than the first configuration management domain.

17. The system of claim 1, wherein a set of tenant resource tags are associated with resources allocated to a specified client.

18. A method, comprising:
associating, by a global resource manager, physical resources and virtual resources within a storage cluster with physical resources and virtual resources provisioned by a cloud infrastructure to form a system that is logically and communicatively interrelated at an application and system level between the storage cluster and the cloud infrastructure, wherein the global resource manager:
assigns a resource tag representative of a tenant resource tag for a resource, wherein the resource tag comprises:
a first field populated with a local resource identifier used by the cloud infrastructure to allocate and locally identify the resource within the cloud infrastructure, wherein the local resource identifier is assigned according to a first configuration management domain of the cloud infrastructure,
a second field populated with a resource access key granting a client with access to a category of resources belonging to a tenant resource account of the client, and
a third field populated with a remote resource identifier assigned according to a second configuration management domain, different than the first configuration management domain, for remotely identifying the resource;
utilizes the resource tag to access the resource identified by the remote resource identifier, wherein the resource access key is used to obtain access to a category of resources that includes the resource; and
managing, by a cloud management layer within the cloud infrastructure, a physical infrastructure layer and a virtual infrastructure layer, wherein the cloud management layer utilizes the local resource identifier to manage the resource; and
processes client requests and responses, store client account information, and queue pending client requests.

19. A non-transitory machine readable medium comprising instructions for performing a method, which when executed by a machine, causes the machine to:
associate, by a global resource manager, physical resources and virtual resources within a storage cluster with physical resources and virtual resources provisioned by a cloud infrastructure to form a system that is logically and communicatively interrelated at an application and system level between the storage cluster and the cloud infrastructure, wherein the a global resource manager;
assigns a resource tag representative of a tenant resource tag for a resource, wherein the resource tag comprises:
a first field populated with a local resource identifier used by the cloud infrastructure to allocate and locally identify the resource within the cloud infrastructure, wherein the local resource identifier is assigned according to a first configuration management domain of the cloud infrastructure,
a second field populated with a resource access key granting a client with access to a category of resources belonging to a tenant resource account of the client, and
a third field populated with a remote resource identifier assigned according to a second configuration management domain, different than the first configuration management domain, for remotely identifying the resource;
utilizes the resource tag to access the resource identified by the remote resource identifier, wherein the resource access key is used to obtain access to a category of resources that includes the resource; and
manage, by a cloud management layer within the cloud infrastructure, a physical infrastructure layer and a virtual infrastructure layer, wherein the cloud management layer utilizes the local resource identifier to manage the resource; and processes client requests and responses, store client account information, and queue pending client requests.

* * * * *